July 15, 1969　　　A. R. BRAULT　　　3,455,026
FILM VIEWER COORDINATE MEASURING MEANS
Filed Oct. 15, 1965　　　6 Sheets-Sheet 1

INVENTOR.
ANDRE R. BRAULT
BY
*James P. Malone*

July 15, 1969  A. R. BRAULT  3,455,026
FILM VIEWER COORDINATE MEASURING MEANS
Filed Oct. 15, 1965  6 Sheets-Sheet 2

INVENTOR.
ANDRE R. BRAULT
BY
*James P. Malone*

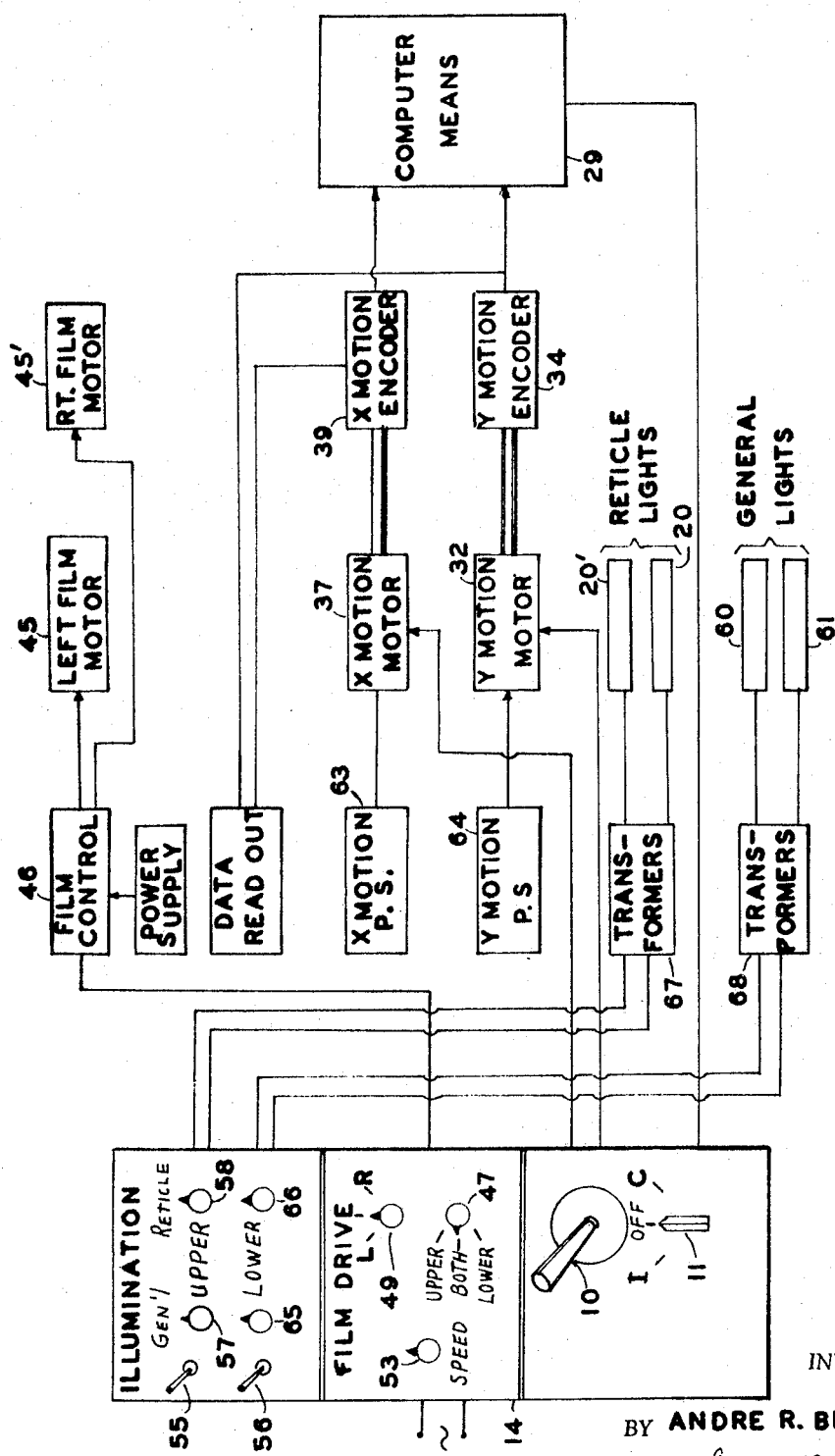

United States Patent Office 3,455,026
Patented July 15, 1969

3,455,026
FILM VIEWER COORDINATE MEASURING MEANS
Andre R. Brault, North Merrick, N.Y., assignor to Optomechanisms, Inc., Plainview, N.Y.
Filed Oct. 15, 1965, Ser. No. 496,392
Int. Cl. G03b *21/14*
U.S. Cl. 33—1
3 Claims

ABSTRACT OF THE DISCLOSURE

A film viewer providing rapid and accurate X and Y coordinate measurements of photographic transparencies. Twin light tables permit comparison of new and old photography. Coordinate measurement is accomplished through projected reticles imaging on the underside of the film. Control and positioning of the reticle by the operator is through a joy stick actuating X and Y stages on precision guide ways.

---

This invention relates to film viewers of the type used in aerial surveys and more particularly to means for viewing film and accurately measuring distances and locating points on the film.

In the present device the points are located and the distances are measured in X and Y coordinates with great accuracy and the information is fed by an electrical encoder which is adapted to feed the information to an indicator or a computer.

The present invention generally provides rapid and accurate X and Y coordinate measurements of photographic transparencies on 9" x 18" formats. Cut film or 500-foot spools of 70 mm. through 9½" film widths are accommodated.

Twin light tables permit comparison of new and old photography. The upper and lower illuminated formats, having motorized film spool drives, will accommodate film chips or glass plates as well as 16 mm. and 35 mm. film.

Coordinate measurement is accomplished through projected reticles imaging on the underside of the film. Control and positioning of the reticle by the operator is through a joy stick actuating X and Y stages on precision guide ways.

A microscope mounted on a rigid swinging arm is used to view selected areas or the reticle pattern against a target for precise measurements. For routine examination, the microscope is positioned out of the way of the viewing area. For quick examination of low altitude targets, a low power magnifier on a retractable arm is positioned over either light table.

The output of measurement of the precision lead screws is through two electrical data encoders. The precision lead screws are made to an accuracy of ±.00025" per linear foot. One encoder measures the distance traversed in the X direction, while the second encoder measures the Y distance.

A data readout selector switch marked "Initial Set" and "Compute" permits the operator to set his zero reference and enter his measurements into a computer or peripheral equipment.

Separate controls also permit the operator to select the most desirable format illumination levels as well as the projected image intensities.

The control panel contains X-Y carriage positioning joy stick controls, switches, and selectors for general and reticle illumination control as well as automatic film spool windup and data readout or zero setting. The viewer and, hence, the control panel are preferably inclined 15" from the horizontal, thus providing convenient sit-stand operating positions for the operator.

Positioning of the reticles is provided through a joy stick and a jog switch at the control panel. The joy stick actuates the carriages from .02"/second up to 0.8"/second, in correspondence with its angular displacement and orientation. A jog switch provides a pulsing motion to the motorized drive allowing fine step or jog positioning to .0002". Constant velocity is variable down to .008"/second approximately.

This equipment is primarily a photo mensuration instrument. Precision lead screws provide accurate X–Y measurements through shaft encoders. Projected reticles are imaged onto the transparent photography which is sandwiched on the illuminated glass formats. These same projected reticle images are accurately positioned through X–Y carriage motion controls on the panel. Hence, an operator can, with the aid of the magnifying loop or microscope, view and position the reticle on photo points, and thereby obtain precise X–Y distance measurement. Because of the twin illuminated formats, this instrument permits comparison and meaesurement of old and new photographs at one set up. As a viewing table the motorized film drives and scanning magnifier provide means for rapid previewing and photo interpretation.

Accordingly, a principal object of the invention is to provide new and improved film viewer and coordinate locating and measuring means.

Another object of the invention is to provide new and improved film viewing and precision coordinate measuring means for comparing two films.

Another object of the invention is to provide new and improved film viewing means for generating electrical coordinate information suitable for computers.

Another object of the invention is to provide new and film coordinate measuring means including a precision mounted reticle projector which is adapted to pin point the points of interest.

Another object of the invention is to provide new and improved photo measuring means comprising a light table, a pair of film spools, one mounted at each end of said table, means to drive said spools, a reticle projector mounted on said table, means to move said reticle projector along X and Y axes of said table comprising, a first carriage mounted under said table to move along said X axis, a second carriage mounted on said first carriage and adapted to move along said Y axis, motor means connected to drive said X and Y carriages, X motion encoder means connected to said first carriage means, Y motion encoder means connected to said second carriage means, and control means connected to said encoder means to zero set said encoder means and to transmit X and Y movement information of said reticle projector along said film relative said reference zero point.

These and other objects of the invention will be apparent from the following specification and drawings of which:

FIGURE 5 is a perspective view of the double reticle arm.

FIGURE 10 is a schematic electrical block diagram.

Figure 1:
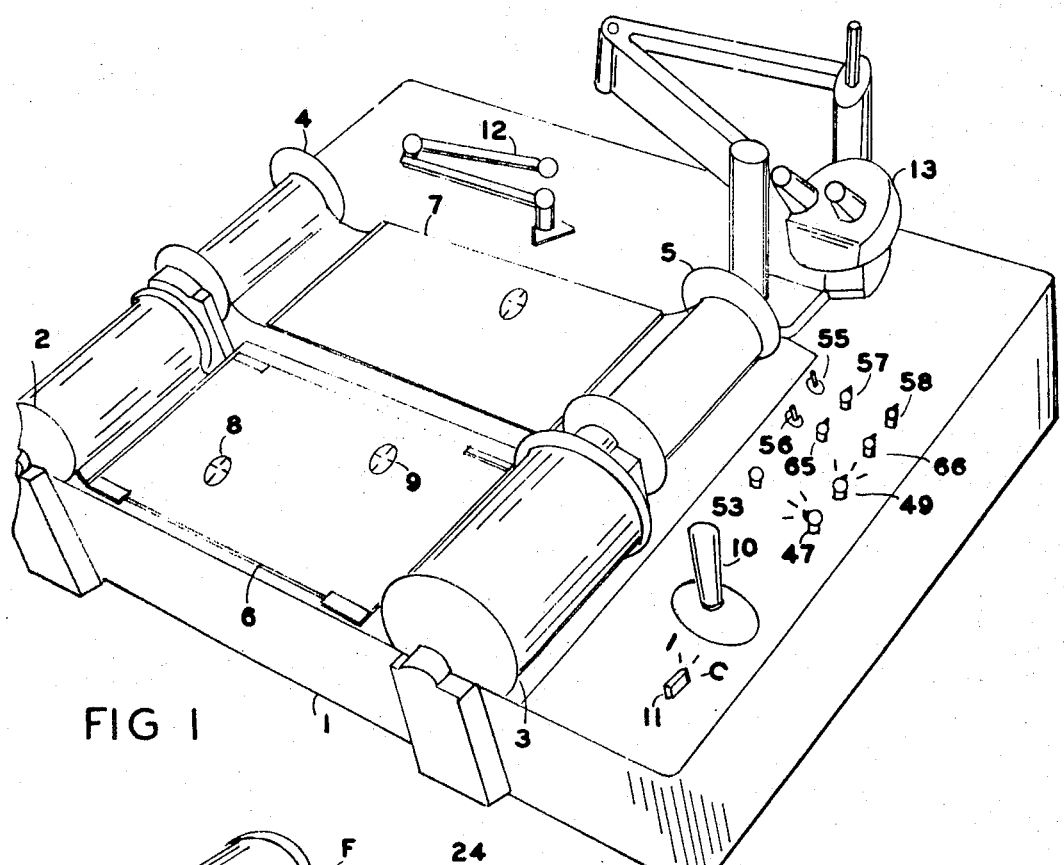
FIGURE 1 is a perspective view of the embodiment of the ivention.

Referring to FIGURE 1, the invention generally comprises a frame 1 adapted to mount a first pair of spools 2 and 3 for a first film and a second pair of spools 4 and 5 for a second film. The pair of spools are located at the end of two light tables 6 and 7 which comprise plates of glass on which the film lays and which preferably have hinged upper plates for holding the film flat. The light tables have general illumination underneath. The measurements are made with a movable reticle projector which projects a reticle image 8 onto the film so that the desired point on the film can be pin pointed. If it is desired to measure the coordinate distances to another point of the film, then the reticle is moved by means of a joy stick control 10 to another point such as 9. The operation of the switch 11 will then feed this coordinate information to a computer or indicator or other utilization device. Motor means are also provided for moving the film as will be described.

Provision is made for mounting two films on the viewer so that old and new photographs may be easily compared. There are two reticle projectors, one for each film. In making the measurements, the reticle is first placed over the first zero point and the switch 11 is moved to the position I to zero set the encoders, or the computers. The reticle is then moved to the second position by control 10 and the switch 11 is turned to the position C for computer and the information is electrically fed to a computer or indicator. Means are provided on the glass plate for aligning the film. These may be engraved marks on the lower plate of the light table.

Also shown in FIGURE 1, are a magnifier viewer 12 mounted on suitable mounting arms and a microscope 13. These are for carefully examining the desired parts of the film. Suitable controls are provided as will be described for the general illumination and for the reticle illumination. The joy stick control 10 may be of the type as shown in Patent No. 3,179,755, granted Apr. 20, 1965.

The reticle arm is mounted underneath the light table on a first carriage which is adapted to move along one axis and the first carriage is mounted on a second carriage which is adapted to move along the other axis. These carriages are mounted on precision ways and are moved by means of precision lead screws. These screws are motor driven and may be driven in both coordinates at once, for instance if the joy stick switch is moved to a 45° angle, both the X and Y cordinates will operate as will be described in more detail.

Figure 2:
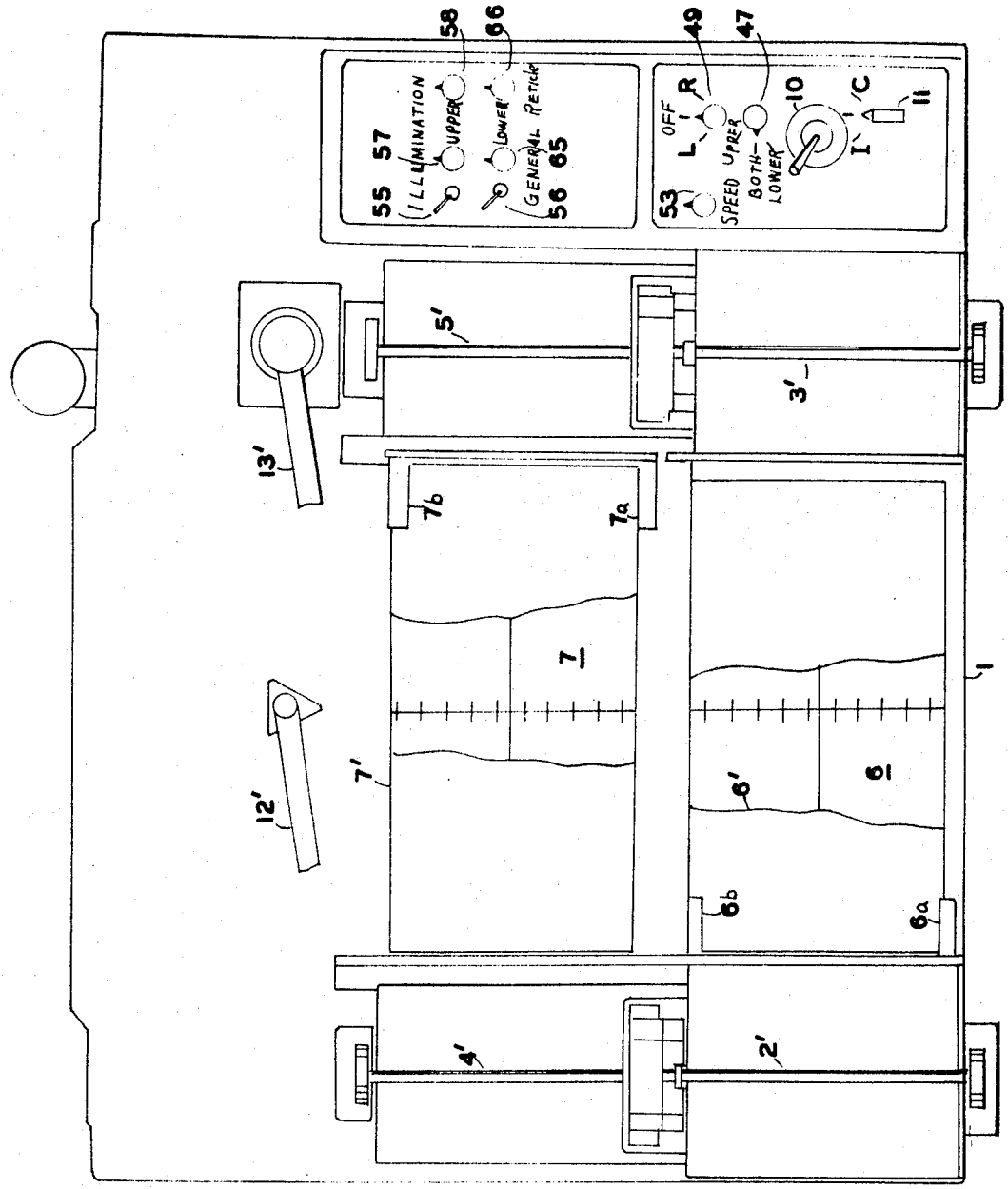
FIGURE 2 is a top view of the embodiment of FIGURE 1.
Figure 3:
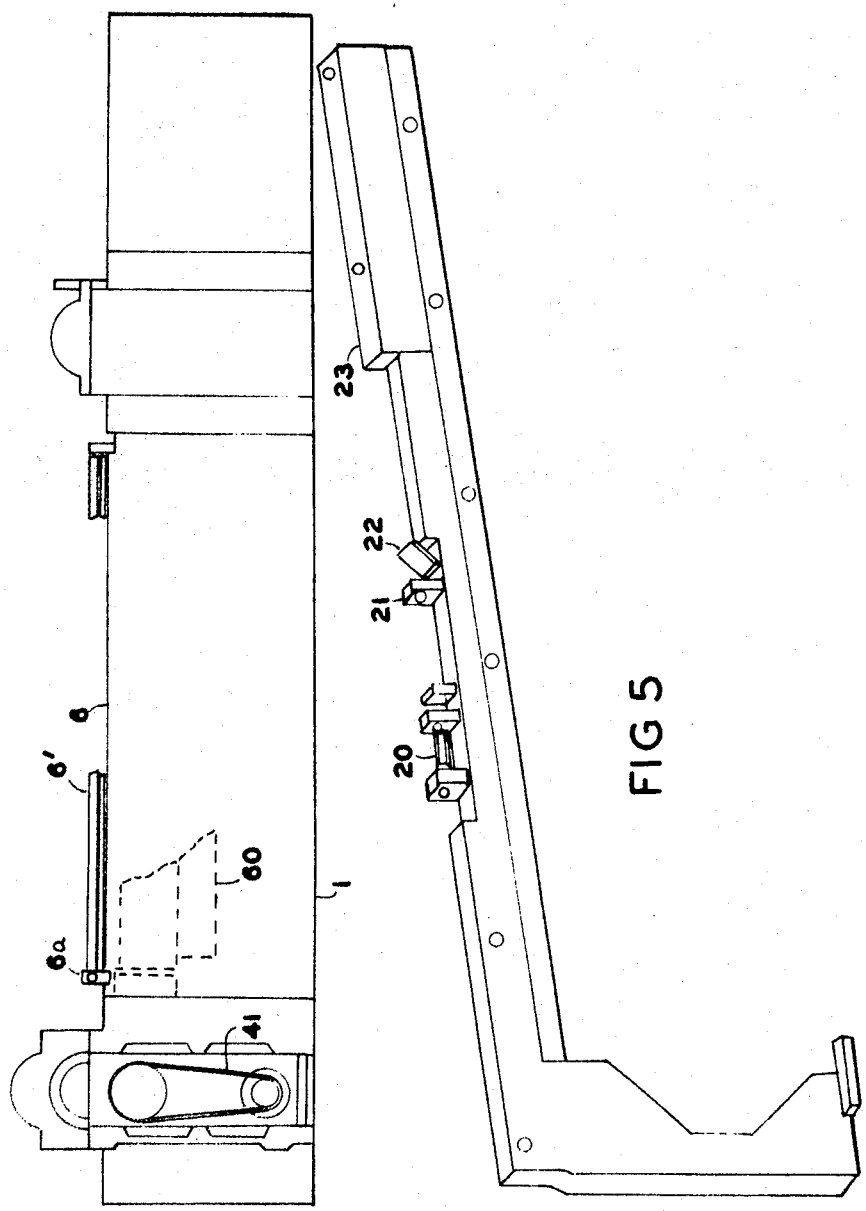
FIGURE 3 is a front view with the cover removed.

FIGURE 2 shows a top view of the embodiment of FIGURE 1. The spools are adapted to be mounted on shafts 2' and 3', 4' and 5' which are rotatably mounted in the frome with suitable bearings. The light tables 6 and 7 have coordinate marks engraved thereon and are preferably covered with upper glass plates 6' and 7' which are hinged to the case by means of hinges 6a, 6b, 7a and 7b. The film shafts are driven from below by chains or belts as shown in FIGURE 3. The right hand side of the top of the case has the conrol panel having the illumniation control, both general and reticle, film drive control, the stick 10, and the Set-Compute control 11. The magnifier glass is mounted on the arm 12' and the microscope is mounted on the arm 13'.

FIGURE 3 illustrates the general light fixtures 60 and 61 which may be fluorescent or cold cathode type. Also, FIGURE 3 illustrates chain or belts 41 for driving the film shafts.

Figure 4:
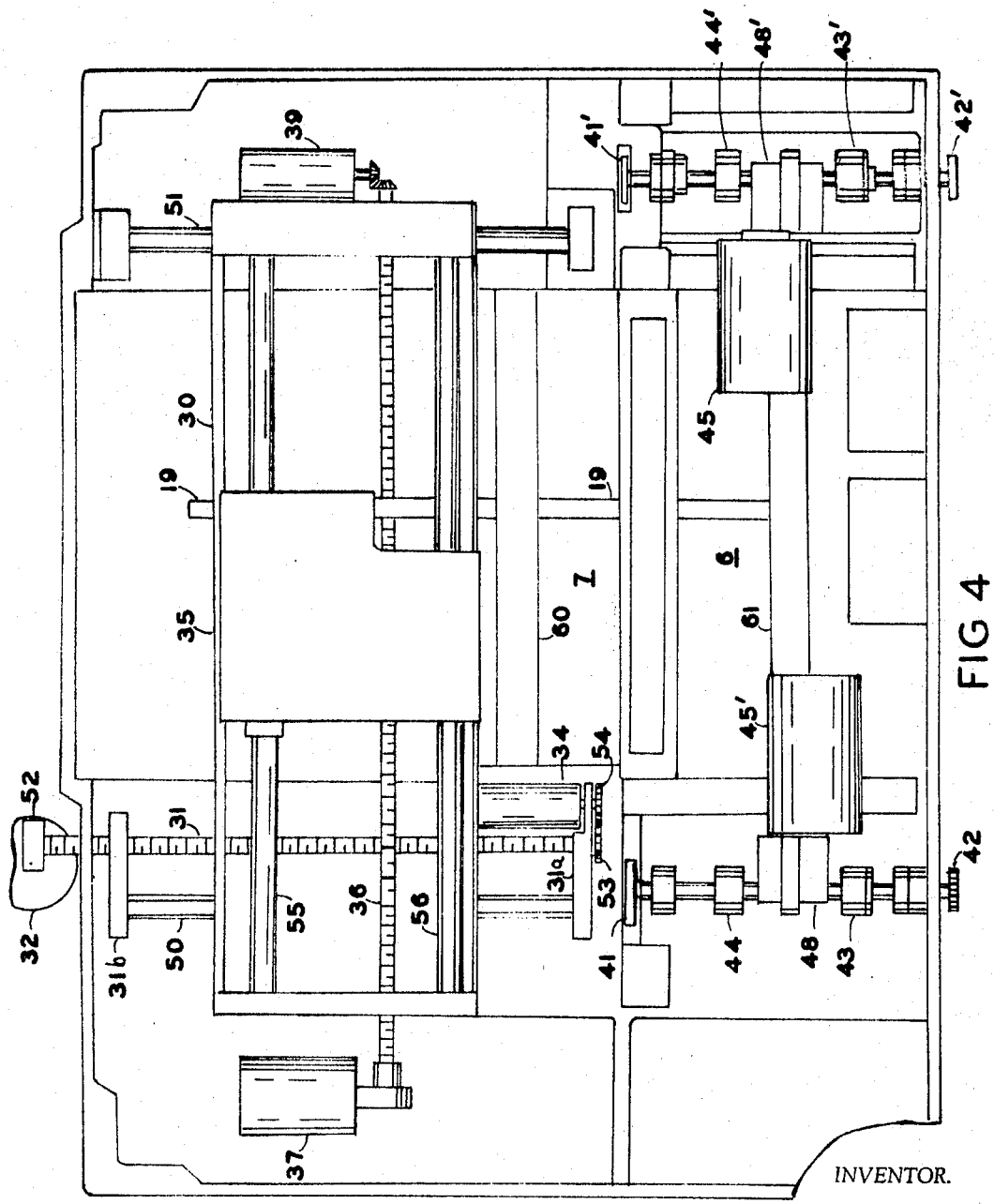
FIGURE 4 is a bottom view of the embodiment of FIGURE 1.

FIGURE 4 shows a bottom view with the bottom cover removed, in order to illustrate the double carriage mechanism. The Y carriage is mounted on precision ways 50 and 51 with precision ball bearings. The Y carriage 30 is moved by means of lead screw 31 which is rotatably mounted in suitable bearings in the brackets 31a and 31b.

The lead screw is driven by the motor 32 by means of the worm and pinion gear arrangement 52. The Y coordinate encoder 34 is geared to the lead screw 31 by means of gears 53 and 54.

The X carriage 35 is mounted on precision ways 55 and 56 which are mounted on the Y carriage. The X carriage 35 is moved by means of the lead screw 36 which is rotatably mounted on the Y carriage and which is driven by means of the X motor 37 which is mounted on the Y carriage and geared to the lead screw 36. The X encoder 39 is geared to the other end of the lead screw and is also mounted on the Y carriage. All of the electrical components have suitably long wires so that the desired movements may be obtained.

Figure 9:
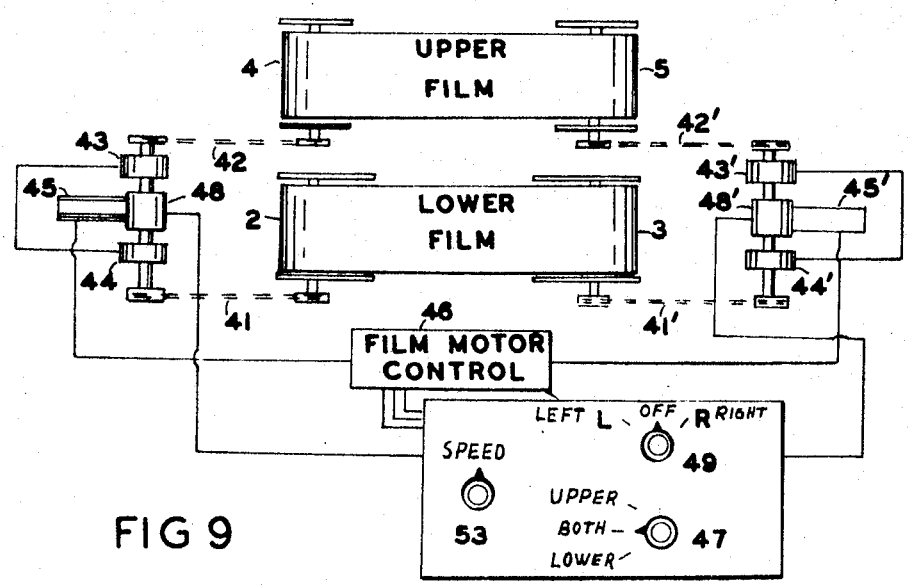
FIGURE 9 is a schematic diagram of the film spool drive.

The right film drive arrangement comprises the motor 45 and the transmission gear box 48, clutches 43 and 44 which are connected to pulleys driving he belts or chains 41 and 42. The left film drive arrangement is identical and comprises the motor 45', transmission gear box 48', clutches 43' and 44' which are connected to pulleys driving the chains or belts 41' and 42', as also shown in FIGURE 9.

The reticle arm 19 is mounted on the X carriage and extends under both of the light tables 6 and 7. The light tables are suitably illuminated by lights 60 and 61 which may be fluorescent or cold cathode tubes or other equivalent lighting means. They are mounted under the reticle arms so as not to interfere with its movement. All of the mechanical moving components have precision ball bearings and precision gearing and the ways are of high precision so that a very high degree of accuracy may be maintained.

The mounting base is preferably made of a fairly heavy casting so that the mechanical assembly is held rigid in order that the required mechanical accuracy can be maintained.

FIGURE 5 shows a perspective view of the double reticle arm 19 which is mounted on the movable carriage. The arm includes two recticle projectors, one of which is uncovered in this view. Each reticle projector comprises a projector lamp 20, which is focused on a reticle 21 and then projected upwardly by a 45° mirror 22. There is another reticle projector in the portion of the arm which is covered by the cover 23. Note, that the reticle projectors are fixedly connected together and spaced so that one image is projected onto each film. Therefore, two films of the same area may be easily compared and measurements may be made on either or both films.

Figure 6:
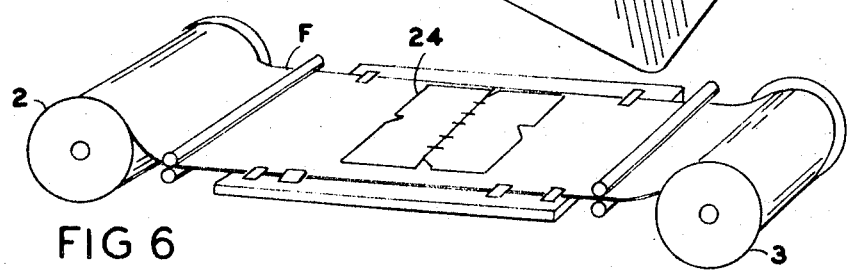
FIGURE 6 is a perspective view of the film viewing plate illustrating lining up of the film coordinates.

FIGURE 6 shows a detail view of the spools and illustrates a method of lining up the film F with the coordinate axis of the machine. An engraved grid 24 is provided on the top surface of the bottom viewing glass to facilitate the alignment of photo fiducial marks with the coordinate system of the comparator. Adhesive tape may be used along the edges to temporarily fix the format alignment and location if desired. A calibration check can be engraved on the lower plate as illustrated in FIGURE 7.

The engraved bottom format plates can provide the operator with a relatively quick and simple means of checking the system's accuracy and performance whenever confidence is questionable.

Figure 7:
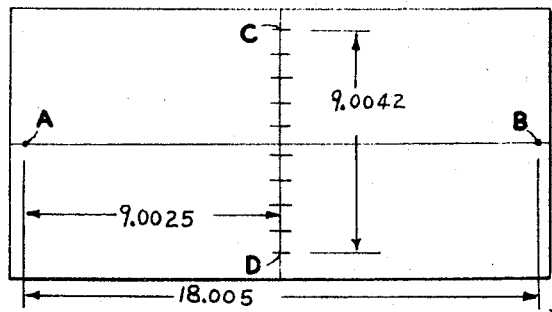
FIGURE 7 is a plan view of the calibration viewing plate.

FIGURE 7 shows for example a typical calibration of, say, the lower format grid on a particular machine. This calibration would be identified and affixed to the comparator.

Should a question arise as to the validity of certain measurements in a future problem, the operator simply checks to see that points A and B are aligned with the coordinate system and then commences to read the coordinates of points A, B, C, and D. The apparatus should be operated at the calibration temperature.

Figure 8:
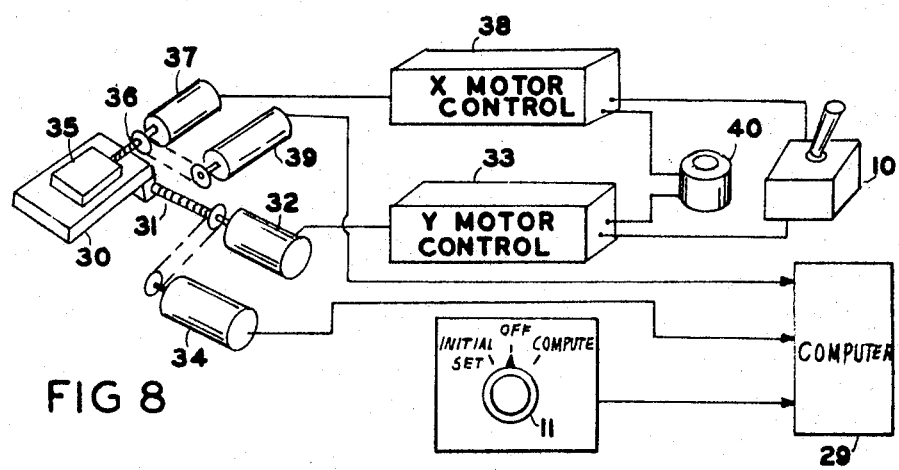
FIGURE 8 is a schematic diagram of X and Y carriage drive.

FIGURE 8 shows a schematic diagram of the X–Y carriage drive. The Y carriage 30 is mounted for movement by the lead screw 31 which is operated by the Y motor 32. The motor is controlled by the motor control 33 which in turn is controlled by the joy stick switch control 10, the details of which are shown in Patent No. 3,179,755, granted Apr. 20, 1965.

The X carriage 35 is mounted on the Y carriage and is moved by means of the lead screw 36 which is driven by the motor 37. The motor is controlled by the control 38 which in turn is controlled by the joy stick control 10. If desired, an additional jog switch 40 may be added. The Y lead screw 31 is geared to the Y encoder 34 and X lead screw is geared to the X encoder 39. The output of the encoders are fed via an output jack to a computer-indicator 29 or other utilization device. The encoders may be selsyn type devices or equivalent which accurately measure and transmit the amount of rotation of the lead screws.

The measurements are made by first moving the reticle projector to pin point a certain zero reference point and moving the control 11 to the set position.

The reticle projector is then moved to a second desired point and the control 11 is then moved to Compute position C. This transmits the coordinate information from the encoders to the computer or indicator.

FIGURE 9 shows a schematic diagram of the film spool drive. The spools are connected by chains or belts 41 and 42 through clutches 43 and 44 to the motor 45. The motor is of the reversible type and is controlled by the controller 46. The motor is geared to the upper or lower or both film drive by means of the transmission 48. The controls which are mounted on the control panel, includes a switch 47 to select the lower or upper drive or both, a directional switch 49 to select the direction of movement and a speed control 53. There is a similar motor drive arrangement 41', 42', 43', 44' 45' and 48' on the other side. The film drive is conventional. Alternatively, the film may be driven manually if desired.

FIGURE 10 shows a schematic block diagram of the complete electrical system. All the controls are mounted on the control panel 14 on the top right hand side of the frame. The Set-Compute switch 11 is connected to the computer 29. The joy stick control is connected to the X and Y motors 37 and 32. The film drive controls 47, 49, and 53 are connected to the film drive controller 46. Conventional power supplies 63 and 64 are provided for the X and Y motors.

The upper light table lighting is controlled by the switch 55 and the lower light table lighting is controlled by the switch 56. Control 57 controls the upper general light intensity and control 58 controls the upper reticle intensity. Control 65 controls the lower general intensity and control 66 controls the lower reticle intensity. Suitable transformers 67 and 68 are provided for the various lights and connected to conventional power supplies. The encoders 34 and 39 are connected to conventional power supplies 34' and 39', and data indicator 70.

Many modifications may be made by those who desire to practice the invention without departing from the scope thereof which is defined by the following claims.

I claim:
1. Photo measuring means comprising:
a light table,
a pair of film spools, one mounted at each end of said table,
means to drive said spools,
a reticle projector mounted under said table,
means to move said reticle projector along X and Y axes of said table comprising,
a first carriage mounted under said table to move along said X axis,
a second carriage mounted on said first carriage and adapted to move along said Y axis,
motor means connected to drive said X and Y carriages,
X motion encoder means connected to said first carriage means,
Y motion encoder means connected to said second carriage means,
control means connected to said encoder means to zero set said encoder means and to transmit X and Y movement information of said reticle projector along said film relative a reference zero point,
a second pair of spools adapted to mount a second roll of film in parallel relation on said light table to said first film,
and a second reticle projector mounted in fixed relation to said first reticle projector to provide accurate means to compare new and old film measurements.

2. Photo measuring means comprising:
a light table,
a pair of film spools, one mounted at each end of said table,
means to drive said spools,
a reticle projector mounted under said table,
means to move said reticle projector along X and Y axes of said table comprising,
a first carriage mounted under said table to move along said X axis,
a second carriage mounted on said first carriage and and adapted to move along said Y axis,
motor means connected to drive said X and Y carriages,
X motion encoder means connected to said first carriage means,
Y motion encoder means connected to said second carriage means,
control means connected to said encoder means to zero set said encoder means and to transmit X and Y movement information of said reticle projector along said film relative a reference zero point,
engraved marks on the surface of said light table for lining up the film with the coordinate axes of said reticle movement,
a second pair of spools adapted to mount a second roll of film in parallel relation on said light table to said first film.
and a second reticle projector mounted in fixed relation to said first reticle projector to provide accurate means to compare new and old film measurements.

3. Photo measuring means comprising:
a light table,
means to mount a film on said table,
a reticle projector mounted on said table,
means to move said reticle projector along X and Y axes of said table comprising,
a first carriage mounted under said table to move along said X axis,
a second carriage mounted on said first carriage and adapted to move along said Y axis,
motor means connected to drive said X and Y carriages,
X motion encoder means connected to said first carriage means,
Y motion encoder means connected to said second carriage means,
control means connected to said encoder means to zero set said encoder means to transmit X and Y movement information of said reticle projector along said film relative a reference zero point, means to mount a second film in parallel relation on said light table to said first film and a second reticle projector mounted in fixed relation to said first reticle projector to provide accurate means to compare new and old film measurements.

References Cited

UNITED STATES PATENTS

| | | |
|---|---|---|
| 2,963,941 | 12/1960 | Burnette. |
| 3,171,323 | 3/1965 | Schober et al. _____ 346—29 X |
| 3,293,651 | 12/1966 | Gerber et al. |
| 3,237,511 | 3/1966 | Helava _____ 88—14 |

FOREIGN PATENTS 702,430  1/1965  Canada.

HARRY N. HAROIAN, Primary Examiner

U.S. Cl. X.R.

356—171